United States Patent
Cooper

[11] 3,712,058
[45] Jan. 23, 1973

[54] SOLID PROPELLANT CONTROLLED ROCKET MOTORS

[75] Inventor: Fredric M. Cooper, Chapel Hill, N.C.

[73] Assignee: Northrop Carolina Inc., Swannanoa, N.C.

[22] Filed: Aug. 14, 1961

[21] Appl. No.: 131,216

[52] U.S. Cl. .................60/207, 60/218, 60/219, 60/254, 60/39.47, 102/49.8
[51] Int. Cl. .................................C06d 5/00
[58] Field of Search......60/35.6 R, 39.47, 254, 35.3; 102/49, 98

[56] References Cited

UNITED STATES PATENTS

| | | | |
|---|---|---|---|
| 2,984,973 | 5/1961 | Stegelman | 60/35.6 R |
| 3,031,842 | 5/1962 | Zedwith | 60/35.6 R |
| 3,038,303 | 6/1962 | Gase | 60/35.6 R |

FOREIGN PATENTS OR APPLICATIONS

| | | | |
|---|---|---|---|
| 570,211 | 6/1945 | Great Britain | 60/35.6 R |

Primary Examiner—Samuel Feinberg
Attorney—Willard M. Graham

EXEMPLARY CLAIM

7. A method of rocket propulsion which comprises providing a solid grain containing a major proportion of a material which is partially decomposible into gaseous intermediates; igniting said grain to produce gaseous intermediate partial decomposition products thereof; passing said gaseous intermediates through flow controlling means; reacting said controlled flow of gaseous intermediates with an oxidizer grain containing a major proportion of an oxidizer reactive with said gaseous intermediates to product thrust-producing gases; and ejecting said thrust producing gases through a rocket nozzle.

8 Claims, 1 Drawing Figure

PATENTED JAN 23 1973
3,712,058
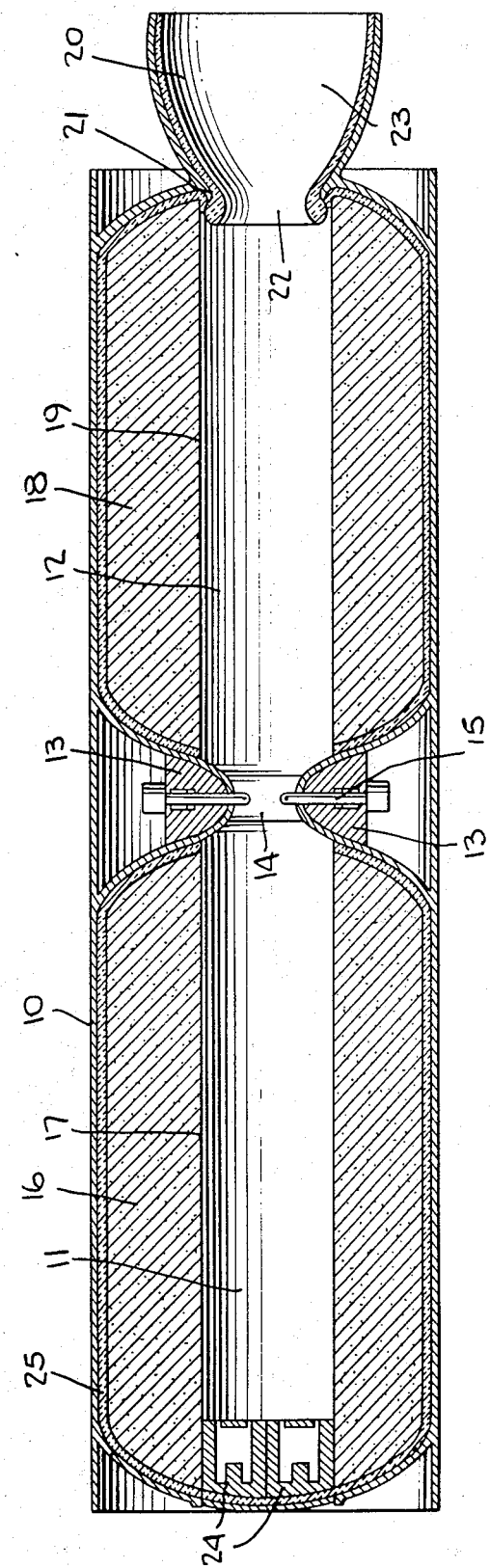

SOLID PROPELLANT CONTROLLED ROCKET MOTORS

This invention relates to rocket motors and more particularly to solid propellant rocket motors in which thrust may be controlled.

While solid propellant rocket motors are considered to offer many advantages over liquid propellant motors, especially in that solid propellant motors are less costly, mechanically simpler, easier to store, easier to operate, more rugged and more reliable, use of solid propellant motors in systems such as missile or satellite systems which require thrust modulation has been retarded because it has been difficult to achieve adequate thrust modulation or control with solid propellant rocket motors. Accordingly, the successful missile and satellite systems have employed mainly liquid propellant rocket motors. To a limited extent, solid propellant motors have been used on missile systems requiring some modulation. However, modulation in these cases has been only of a rudimentary nature in which the effects of thrust rather than the thrust itself has been controlled, e.g., injecting thrust spoilers into the exhaust or by extending air brakes or flaps from the missile. Further, the desired thrust characteristics of the rocket motor had to be programmed into the motor and such characteristics could not be changed once the motor had started.

Accordingly, it is an object of this invention to provide a novel solid propellant rocket motor, the thrust of which may be accurately controlled while the motor is in operation.

It is another object of this invention to provide a solid propellant rocket motor, the thrust of which may be completely terminated and reinitiated in flight.

It is a further object of this invention to provide a method for controlling the thrust of a solid propellant rocket motor.

It is yet a further object of this invention to provide a method for terminating a solid rocket motor in flight and then restarting the motor in flight.

Other objects and advantages of this invention will become apparent from the description and claims which follow. Unless otherwise specified, all proportions are by weight.

In accordance with one aspect of this invention, there is provided a rocket motor comprising a zone for effecting a partial decomposition of a solid fuel to produce gaseous intermediates, a zone spaced from said first zone in which said gaseous intermediates undergo further decomposition to form thrust producing gases and means for the passage of gases between said zones.

In accordance with a further aspect of this invention, there is provided a rocket motor comprising two chambers connected by a conduit. The first chamber contains a fuel grain, preferably comprising primarily fuel for the rocket motor. The first chamber further includes means for effecting the partial decomposition of said fuel grain to produce gaseous intermediates which are capable of further decomposition, as will be hereinafter described. The partial decomposition is preferably a partial combustion of the fuel grain which may be initiated by ignition means such as an igniter. The igniter increases the temperature of the fuel grain sufficiently to initiate combustion and it also maintains and increases if necessary the pressure in the first chamber to a point sufficient to maintain the desired level of partial combustion. The gaseous intermediates then pass from the first chamber to the second chamber through the connecting conduit. In the second chamber, the gaseous intermediates come into contact with a solid composition preferably in the form of a grain. This composition is reactive with the gaseous intermediates to effect a further and preferably extensive decomposition (e.g., combustion) of said gaseous intermediates to form the thrust producing gases.

The control of the thrust of the rocket motor is achieved through the use of a valve which controls the size of the opening in the connecting conduit. Using a given fuel grain, the amount of thrust is substantially dependent upon the rate of flow of the gaseous intermediates into the second chamber which is dependent on the rate of the partial decomposition of the fuel grain. Variations in the conduit opening as effected by the valve will alter the pressure in the first chamber and consequently affect the rate of the partial combustion of the fuel grain as well as altering the rate of flow of the gaseous intermediates into the second chamber. Accordingly, for example, in the case of fuels the decomposition of which varies directly with pressure narrowing the conduit opening will increase the pressure in the first chamber, thereby increasing the rate of the partial combustion of the fuel grain and increasing the amount of the intermediate gases and the thrust producing gases formed. Furthermore, in the case of fuels with inverse pressure characteristics, narrowing of the conduit opening will decrease the amount of intermediate gases and thus the thrust producing gases formed. The valve may be readily controlled by a sensor and control system on board the rocket vehicle or from the ground by conventional remote control means.

It is preferable that the solid composition in the second chamber comprises primarily oxidizer. Thus, the intermediate gases are oxidized in the second chamber to form the thrust producing gases. It should be here understood that the further decomposition which takes place in the second chamber may be an oxidation.

In accordance with a further aspect of this invention provision is made for thrust termination and motor restart while in flight. In this connection, it is to be noted that the solid composition (e.g., oxidizer) in the second chamber is non-reactive and thus cannot support combustion once the flow of gaseous intermediates is stopped. Therefore, the motor may be stopped by terminating the supply of intermediate gases to the second chamber. One preferred method of accomplishing this is to rapidly fully open the valve to completely open the conduit leading to the second chamber, thereby terminating the partial decomposition reaction in the first chamber by rapid decompression of the first chamber. This will terminate the supply of intermediate gases to the second chamber to terminate the reaction in the second chamber. The rocket motor may also be equipped with auxiliary means for venting the accumulated gases in the first chamber to the outside to further decrease the temperature and pressure in the first chamber to levels below that necessary to support the partial decomposition reaction. A convenient method for simultaneously effecting the rapid opening of the conduit and the venting to the outside is by the use of a dual valve arrangement to control the connecting conduit. Such a dual valve would have in addition to the above-described means for controlling the conduit passage, passage means opening from said first chamber to the outside. During the operation of the motor, such passage means to the outside would be blocked by the valve. However upon the rapid opening of the connecting conduit means by the valve, the outside passage means could be also rapidly opened to rapidly vent the gases in the first chamber, thereby terminating combustion. Further, in many instances the combustion in the first chamber could be terminated merely by the auxiliary venting means without changing the conduit opening.

An alternative method of stopping the motor is to completely close the conduit opening, thereby cutting off the supply of intermediate gases to the second chamber. The partial decomposition reaction must be terminated before closing the conduit. It may be terminated in many ways, e.g., by injecting a combustion "poison" into the first chamber or using a coolant to cool the surface of the fuel. As previously mentioned, the operation of the valve may be accomplished by remote control. The stopped motor may then be restarted in flight by closing the vent passage to the outside, opening the connecting conduit to the size resulting in the pressure desired in the first chamber and reigniting the unreacted portion of the fuel grain in the first chamber.

This invention will be better understood by reference to the accompanying drawing which is a diagrammatic longitudinal section of one embodiment of the rocket motor of this invention.

The rocket motor comprises a cylindrical case 10 of preferably metal or fiber composition, e.g., chrome-molybdenum steel, fiberglass-epoxy resins. The case contains a forward chamber 11 and a rear chamber 12 separated by a partition 13 having formed therein a conduit 14 connecting the chambers. Throttle valve 15 is capable of widening and constricting the passage through conduit 14. Fuel-rich grain 16 retained within forward chamber 11 is cylindrical in shape and has a passage 17 therethrough. The composition of the fuel-rich grain will be considered in greater detail hereinafter.

Oxidizer-rich grain 18 retained in rear chamber 12 is also cylindrical in shape and has a passage 19 therethrough. At the rear end of the rear chamber, nozzle 20 is mounted within opening 21. The nozzle comprises throat 22 and expansion cone 23. Passage 17 is continuous with passage 19 through conduit 14 and passage 19 is continuous with nozzle 20. Igniters 24 are mounted in chamber 11 within passage 17. It will be noted that this embodiment has two igniters. One of the igniters is for the initial ignition of the motor and the second igniter is for a reignition of the motor after said motor has been stopped in flight. Using such an ignition arrangement, it will be appreciated that there should be one additional igniter for each contemplated reignition of the motor. It will be understood by those skilled in the art that the multiple igniter ignition means described here represent just one convenient method of restarting the motor and that other ignition means include single ignition means such as electric heaters imbedded in the propellant or highly reactive liquid sprayed into contact with the fuel. Thermal insulation layer 25 separates the case walls from the grains in both the forward and rear chambers.

Considering now a cycle of operation of the rocket motor, to start the motor, one of the igniters ignites the exposed surface of the fuel rich grain 16 abutting passage 17 while valve 15 maintains the passage in conduit 14 open to the extent necessary for the pressure in chamber 11 to build up to the level desired for the selected partial decomposition rate of the fuel in the fuel-rich grain. The fuel-rich grain decomposes from its inner surfaces outward to form gaseous intermediates which then pass through conduit 14 into rear chamber 12. It should be noted here that while the partial decomposition products are predominantly gaseous, some solid partial decomposition product may also be produced and carried into the rear chamber by the gaseous intermediates. In passage 19 of the rear chamber, the gaseous intermediates contact the inner surface of oxidizer-rich grain 18 and undergo further decomposition, preferably they are oxidized to substantially complete decomposition. The decomposition of the intermediates forms the thrust producing gases which are exhausted through nozzle throat 22 into expansion cone where these gases expand to provide the thrust of the motor. As has been previously described, valve 15 is regulated by remote control to control the size of passage 14, thereby controlling the rate of partial decomposition or combustion of the fuel-rich grain as well as the rate of flow of the gaseous intermediates into the rear chamber. This in turn controls the amount of thrust producing gases formed in the rear chamber and hence the thrust of the motor.

Further, as has been previously described, the motor may be stopped in flight by rapidly opening conduit 14 and rapidly venting the gases in the forward chamber to the rear chamber to decrease the pressure and temperature in the forward chamber to levels insufficient to support partial combustion. The motor may then be reignited, using the second igniter.

The fuel-rich grain may contain as fuel, any material which is capable of partial decomposition to produce intermediate gases which gases are capable of further rapid exothermic decomposition when brought into contact with an oxidizer or other suitable reactant. Such fuels include conventional rocket fuels such as asphalt, two part mixtures of very high molecular weight materials with a plasticizer or solvent, e.g., mixtures of polyvinylchloride resins and plasticizers, polysulfide polymers such as poly (diethyl formal disulfide) polyurethanes. Other fuels include polyolefins such as polyethylene, polystyrene, buna N, buna S, decarborane, cellulose, wood, coal as well as inorganics including metals such as lithium magnesium, aluminum, beryllium and metal hydrides such as lithium hydride.

It has been found that desirable results are achieved when using a fuel comprising "double base" materials comprising a high molecular weight component such as nitrocellulose, and a plasticizer such as nitroglycerin or other nitrate ester particularly nitrate esters of polyhydric alcohols such as triethylene glycol dinitrate and diethylene glycol dinitrate.

In one embodiment of a fuel grain used in this invention, a composition comprising nitrocellulose, a nitrate ester-plasticizer such as nitroglycerine or triethylene glycol dinitrate and a polyolefin such as polyethylene is used.

The fuel-rich grains may be produced by a number of methods such as extrusion, molding or casting.

The oxidizer-rich grain comprises primarily oxidizer for the intermediates gaseous decomposition products. The nature of the oxidizer will, of course, depend on the nature of the fuel and intermediates formed. Suitable oxidizers include perchlorates such as potassium perchlorate, ammonium perchlorate, lithium perchlorate, nitronium perchlorate, nitrates such as sodium, potassium and ammonium nitrate, lithium as well as hexanitroethane or derivatives of nitroform.

Where the preferred fuel composition comprising nitrocellulose, nitrate esters and polyethylene is used in the fuel-rich grain, desirable results are obtained when the oxidizer-rich grain comprises ammonium perchlorate. Preferably the oxidizer-rich grain comprises at least 85 percent and most preferably at least 95 percent of ammonium perchlorate. The remainder of the grain composition constitutes a binder which may be a tetrahaloethylene polymer such as polytetrachloroethylene or polyfluorotrichloroethylene.

The oxidizer-rich grain may be prepared by the methods described above for the preparation of the fuel-rich grain. However, it is preferable to prepare the oxidizer-rich grain by pressure molding. This produces a high density grain.

The igniters which may be used in the preferred embodiment of this invention include black powder igniters initiated by electric squibs, pyrophoric liquids, chemical pyrotechnics, electric currents or exploding bridge wire.

It is preferable that the conditions are such that a major portion of the reaction energy of the fuel is liberated in the rear chamber. For purposes of this application, reaction energy may be defined as the total energy liberated by the complete decomposition (e.g., combustion) of the fuel. The energy is liberated as thermal energy which is converted in the rocket motor to the kinetic energy of the thrust producing gases. Accordingly, a major portion of the conversion of reaction energy to kinetic energy will take place in the rear chamber. Since decomposition reaction in the rear chamber may be controlled by regulating the flow of gaseous intermediates, it is most advantageous to have as high a proportion of reaction energy as possible converted in the rear chamber. This would provide a maximum range of control. Furthermore, if the amount of reaction energy liberated in the forward chamber is maintained at a minimum, the temperature of the valve may be kept as low as possible. It is highly desirable to keep the valve temperature as low as possible in order to obtain maximum efficiency and control by the valve. Maximum overall rocket motor performance would be obtained if the reaction energy converted in the front chamber would be the minimum amount required to decompose the fuel to the point that said fuel is gasified into gaseous intermediates and to maintain the pressure of the first chamber at the selected level. As previously mentioned, the pressure of the forward chamber must be at a level sufficient to support the partial decomposition of the fuel. Further, the forward chamber is preferably at a higher pressure than the second chamber. While the operating pressures in the forward and rear chambers will vary with the nature and characteristics of the fuel and oxidizer, the size and shape of the grains and the size of the passage through the grain, the pressure in the forward chamber is preferably at ;east slightly higher and most preferably at least 100 percent higher than that in the rear chamber. For example, when employing the novel fuel comprising nitrocellulose, triethylene glycol dinitrate and an oxidizer-rich grain comprising ammonium perchlorate, the pressure in the front chamber is preferably in the range of from 300 to 3,000 psia and most preferably from 150 to 2,000 psia and the pressure in the rear chamber is preferably in the range of from 150 to 1,500 psia and most preferably from 75 to 1,000 psia.

It is preferable that at least 75 percent and most advantageously 99 percent of the reaction energy of the fuel is converted in the rear chamber.

Examples I and II are given to illustrate methods of making the grains used in this invention.

Example I

A fuel-rich grain was prepared by admixing 44 parts of nitrocellulose, 44 parts of triethylene glycol dinitrate and 12 parts of polyethylene. The mixture was then cast in a mold designed to produce a cylindrical structure having a centrally located cylindrical passage therethrough and cured at 50°C. for 18 hours.

EXAMPLE II

A high density oxidizer-rich grain was prepared by admixing 90 parts of ammonium perchlorate and 10 parts of a fully saturated chlorofluoroethylene copolymer comprising chlorotrifluoroethylene and vinylidene fluoride and containing more than 50 percent fluorine by weight. The mixture was then poured into a mold designed to produce a cylindrical structure having a centrally located cylindrical passage therethrough. The mold had been evacuated of air. The mixture was then pressed between the dies of the mold at a pressure of 5,000 p.s.i. and a temperature of 120°C. for 5 minutes.

While the grains described in the previous examples, are grains having a single cylindrical central passage, it will be understood that the practice of this invention is not limited to such a grain structure. Any grain structure used in propellants may be used in the grains. The grains may have a plurality of passages. The shape of the passages may be varied, e.g., the opening may be star shaped, branched or cross shaped. In addition grains having peripheral passages as well as grains having no passages may be used.

EXAMPLE III

Using fuel-rich and oxidizer-rich grains each weighing 102.1 lbs. and prepared in accordance with Examples I and II respectively, a rocket motor may be built in accordance with FIG. 1 of the drawings. The rocket motor loaded weight (without payload) is 268.8 lbs. The total length is 46 inches and the outside diameter is 12 inches. The rocket motor when initially ignited develops a maximum thrust of 10,000 lbs. By controlling the conduit opening by means of the valve the thrust may be varied between about 500 and 10,000 lbs. Under maximum thrust operating conditions, the forward chamber pressure is 2,000 p.s.i.a. and the rear chamber pressure is 1,000 p.s.i.a. At 40,000 ft. altitude and 10,000 lbs. thrust, the Specific Impulse of the motor is 256 pound seconds per pound of combined propellant. After 3.9 seconds the motor is stopped by remote control by closing the connecting conduit and venting the gases in the forward chamber. After 22 seconds, the motor is reignited and develops a thrust of 5,000 lbs. under a forward chamber operating pressure of 1,000 p.s.i.a. and a rear chamber operating pressure of 500 p.s.i.a. The Specific Impulse at 40,000 ft. altitude of the reignited motor is 250 pound seconds per pound of propellant mixture.

The proportion of oxidizer in the oxidizer-rich grain to the fuel in the fuel-rich grain will vary with the nature of fuel and oxidizer. When using the fuel described in Example I and ammonium perchlorate, it is preferable to have from about 7 to 27 parts and most preferably from 12 to 20 parts of ammonium perchlorate present in the oxidizer-rich grain for each part of excess polyethylene present in the fuel-rich grain.

EXAMPLE IV

Example III is repeated using the same materials, proportions and conditions except that instead of the oxidizer-rich grain composition of Example II the oxidizer-rich grain comprises 90 parts of ammonium perchlorate and 10 parts of tetrafluoroethylene polymer. The results are the same as in Example IV.

While the fuel-rich grain chamber and the oxidizer-rich grain chamber have been described as front and rear chambers respectively, it should be understood that the apparatus of this invention may operate with other chamber arrangements. For example, with the proper means for the utilization of thrust produced, the arrangement of the chambers could be reversed or mounted above and below each other or telescopically mounted with respect to each other.

It is understood that the foregoing detailed description is given merely by way of illustration and that many variations may be made therein without departing from the spirit of the invention.

Having described my invention what I desire to secure by Letters Patent is:

1. A controllable solid fuel, solid oxidizer rocket motor having a determined variable thrust and adapted to be started and stopped repeatedly while in flight, which motor comprises: a forward chamber having a solid grain therein which grain contains a fuel consisting essentially of a material which is partially decomposable to intermediate gaseous products which are themselves combustible to form high energy thrust producing gaseous products; an after chamber having a solid grain therein which grain consists essentially of an oxidizer and a binder; a conduit connecting said forward and after chambers so positioned to permit the passage there through of said intermediate gaseous products from said forward chamber to said after chamber; a throttle valve in said conduit adapted to regulate the flow of said intermediate gaseous products from said forward chamber to said after chamber; ignition means in said forward chamber adapted to ignite said fuel grain and also to re-ignite said fuel grain after partial decomposition of such grain has been stopped; and a rocket nozzle in operative association with said after chamber through which the products of combustion of said oxidizer grain and said intermediate gaseous products pass by which passage a thrust is imparted to said rocket motor.

2. A rocket motor comprising an oxidizer chamber containing a solid grain a major portion of which is oxidizer; a fuel chamber containing a solid grain a major portion of which is a solid rocket fuel; a conduit adapted to the passage of fluids there through operatively connecting said fuel chamber with said oxidizer chamber; and a valve in said conduit adapted to control the passage of fluids between said oxidizer chamber and said fuel chamber, said valve being operative from fully open to fully closed position; said chambers being so arranged as to be operative in tandem through said conduit; the solid grain of the chamber which is operatively the forward of the two chambers being combustible to produce gaseous intermediates which, when reacted with the solid grain of the chamber which is operatively the after of the two chambers, produces thrust producing gasses.

3. The rocket motor claimed in claim 2 wherein said chambers are structurally in tandem.

4. The rocket motor claimed in claim 2 wherein said forward chamber contains said solid rocket fuel grain.

5. A rocket motor as claimed in claim 2 wherein said valve is controlled from a source remote from said motor.

6. A dual grain solid propellant rocket motor comprising a forward chamber containing a solid grain a major proportion of which is solid rocket fuel which is partially combustible to produce combustible intermediate gases; an after chamber containing a solid grain a major proportion of which is an oxidizer reactive with said intermediate gases; a conduit operatively connecting said forward and said after chamber adapted to the passage of said intermediate gasses there through; valve means in said conduit adapted to control the flow of said intermediate gases through said conduit; a rocket nozzle operatively associated with said after chamber adapted to direct the efflux of thrust producing gases, formed by the reaction of said oxidizer and said intermediate gases, into a thrust producing stream; and at least one igniter in said forward chamber operatively associated with said solid fuel grain to at least once ignite said fuel grain whereby said intermediate gases are produced.

7. A method of rocket propulsion which comprises providing a solid grain containing a major proportion of a material which is partially decomposible into gaseous intermediates; igniting said grain to produce gaseous intermediate partial decomposition products thereof; passing said gaseous intermediates through flow controlling means; reacting said controlled flow of gaseous intermediates with an oxidizer grain containing a major proportion of an oxidizer reactive with said gaseous intermediates to produce thrust-producing gases; and ejecting said thrust producing gases through a rocket nozzle.

8. The process claimed in claim 7 wherein said oxidizer grain has a passage there through and wherein said intermediate gases pass therethrough.

* * * * *